(12) United States Patent
Horikawa

(10) Patent No.: US 11,411,217 B2
(45) Date of Patent: Aug. 9, 2022

(54) POSITIVE ELECTRODE ACTIVE MATERIAL AND SECONDARY CELL COMPRISING THE POSITIVE ELECTRODE ACTIVE MATERIAL

(71) Applicant: TOYOTA JIDOSHA KABUSHIKI KAISHA, Toyota (JP)

(72) Inventor: Daisuke Horikawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 225 days.

(21) Appl. No.: 16/597,486

(22) Filed: Oct. 9, 2019

(65) Prior Publication Data

US 2020/0119345 A1 Apr. 16, 2020

(30) Foreign Application Priority Data

Oct. 12, 2018 (JP) .............................. JP2018-193791

(51) Int. Cl.
*H01M 4/48* (2010.01)
*H01M 10/0525* (2010.01)
*H01M 4/02* (2006.01)

(52) U.S. Cl.
CPC ......... *H01M 4/48* (2013.01); *H01M 10/0525* (2013.01); *H01M 2004/027* (2013.01); *H01M 2004/028* (2013.01)

(58) Field of Classification Search
None
See application file for complete search history.

(56) References Cited

U.S. PATENT DOCUMENTS

| | | | |
|---|---|---|---|
| 2015/0228969 | A1 | 8/2015 | Cho et al. |
| 2016/0301069 | A1 | 10/2016 | Kwak et al. |
| 2017/0155134 | A1 | 6/2017 | Sugiura |
| 2018/0069236 | A1 | 3/2018 | Yuge et al. |
| 2018/0277830 | A1* | 9/2018 | Xing ..................... H01M 4/131 |

FOREIGN PATENT DOCUMENTS

| | | |
|---|---|---|
| JP | 2001-266879 A | 9/2001 |
| JP | 2011-519142 A | 6/2011 |
| JP | 2011-210694 A | 10/2011 |
| JP | 2012-142268 A | 7/2012 |
| JP | 2017-103058 A | 6/2017 |
| KR | 10-2016-0146145 A | 12/2016 |
| WO | 2010/053222 A1 | 5/2010 |
| WO | 2012/080826 A1 | 6/2012 |

* cited by examiner

*Primary Examiner* — Zhongqing Wei
(74) *Attorney, Agent, or Firm* — Sughrue Mion, PLLC

(57) ABSTRACT

The positive electrode active material for a secondary cell disclosed herein comprises a base portion including a compound capable of occluding and releasing charge carriers; an electron conductor disposed on at least a part of a surface of the base portion; and a dielectric disposed on at least a part of the surface of the base portion.

8 Claims, 1 Drawing Sheet

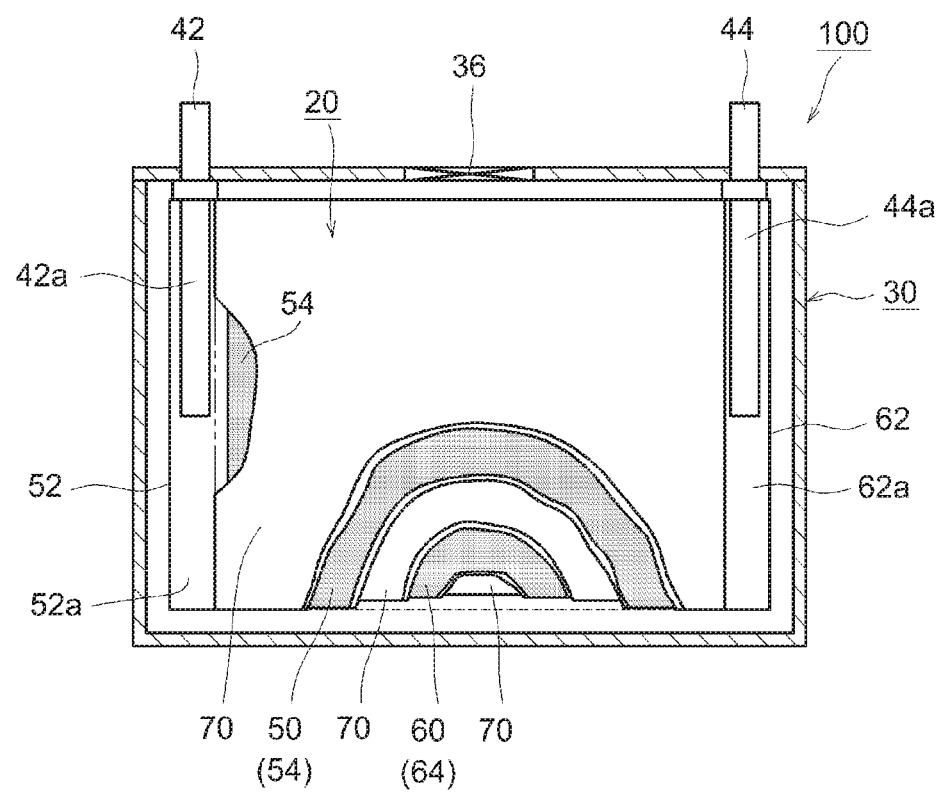

POSITIVE ELECTRODE ACTIVE MATERIAL AND SECONDARY CELL COMPRISING THE POSITIVE ELECTRODE ACTIVE MATERIAL

CROSS-REFERENCE TO RELATED APPLICATIONS

The present application claims priority based on Japanese Patent Application No. 2018-193791, filed on Oct. 12, 2018, the entire contents of which are incorporated herein by reference.

BACKGROUND OF THE INVENTION

1. Field of the Invention

The present invention relates to a secondary cell and a positive electrode active material included in a positive electrode of the secondary cell.

2. Description of the Related Art

In recent years, secondary cells such as lithium ion secondary cells and sodium ion secondary cells have been advantageously used not only as so-called portable power sources for personal computers, portable terminals and the like, but also as power sources for driving vehicles. A secondary cell such as a lithium ion secondary cell for this application is required to have high output characteristics (for example, a low internal resistance of the cell) and durability (for example, an excellent cycle characteristic) for maintaining the desired output over a long period of time when mounted on a vehicle.

Research and development are being conducted from various angles in order to improve the output characteristics and durability of secondary cells for driving the vehicles. One approach is to examine the configuration (composition) and structure of the positive electrode active material used in the secondary cell. For example, Japanese Patent Application Publication No. 2011-210694 discloses a positive electrode active material for a nonaqueous electrolyte secondary cell that has been improved to enhance output characteristics in a low-temperature range. In addition, Japanese Patent Application Publication No. 2017-103058 discloses a positive electrode active material that makes it possible to realize satisfactory cycle characteristics.

SUMMARY

The positive electrode active materials described in the abovementioned patent literature achieve certain results in terms of improving the low-temperature characteristics (Japanese Patent Application Publication No. 2011-210694) and cycle characteristics (Japanese Patent Application Publication No. 2017-103058). However, there is still room for improvement from the viewpoint of further improving the performance (output characteristics, cycle characteristics, and the like) of the secondary cell to be used as a power source for driving a vehicle.

The present invention aims to improve the performance of a secondary cell based on the approach of improving the structure and configuration of the positive electrode active material as described in each of the abovementioned patent literature, and it is an object of the present invention to provide a positive electrode active material for a secondary cell which makes it possible to realize excellent output characteristics (reduction in the internal resistance of the cell) and also a secondary cell provided with the positive electrode active material.

The inventors of the present invention disposed various substances on the surface of a positive electrode active material (base portion) to be used for a secondary cell, and comprehensively studied the effects obtained thereby. It was found that the internal resistance of the cell can be reduced and cycle characteristics can be improved by using a positive electrode active material in which two types of compounds described hereinbelow, which have completely different electrical properties from each other, are disposed on at least a part of the surface, and the present invention has been accomplished based on this finding.

Thus, the positive electrode active material provided by the present invention is used for a secondary cell such as a lithium ion secondary cell, a sodium ion secondary cell and the like, the positive electrode active material comprising:
  a base portion including a compound capable of occluding and releasing charge carriers;
  an electron conductor disposed on at least a part of a surface of the base portion; and
  a dielectric disposed on at least a part of the surface of the base portion.

In the present description, the term "secondary cell" refers, in general, to a storage device that can be repeatedly charged and discharged, and is a term inclusive of so-called storage cells such as lithium ion secondary cells and storage elements such as electric double layer capacitors.

The "positive electrode active material" and the "negative electrode active material" are materials used for the positive electrode and the negative electrode, respectively, of a predetermined secondary cell, and are capable of reversibly occluding and releasing chemical species serving as charge carriers.

The "electron conductor" refers to a substance (conductor) that exhibits electron conductivity, that is, electric conductivity by the movement of electrons. Typically, it refers to a substance having a volume resistivity ($\rho_v$) at 25° C., which is an inherent value of the substance, of $1\times10^0$ $\Omega \cdot m$ or less.

The term "dielectric" refers to a substance that is more dielectric than conductive and can be considered as an insulator with respect to a direct current voltage. Typically, it refers to a substance having a volume resistivity ($\rho_v$) at 25° C., which is an inherent value of the substance, of $1\times10^5$ $\Omega \cdot m$ or more. The dielectric constant (25° C., 1 MHz) of the particularly preferred dielectric is 8 or more.

The inventors of the present invention have found that as a result of disposing two types of compounds, which have completely different electrical properties from each other on the surface of the positive electrode active material (base portion) used in a secondary cell, that is, an electron conductor and a dielectric, on at least a part of the surface of the positive electrode active material (base portion), the electric conductivity of the charge carriers in the electrolyte present between the electron conductor and the dielectric is uniquely improved. Specifically, it has been found that the speed of conduction of charge carriers (lithium ions, sodium ions, and the like) between the positive electrode active material and the electrolyte is increased. Furthermore, it has been found that an effective conduction path of the charge carriers is formed at the hetero-interface between the dielectric and the electron conductor, and the diffusion of the charge carriers to the active material is accelerated.

Therefore, by using the positive electrode active material disclosed herein for the positive electrode of a secondary cell, the internal resistance of the cell can be effectively reduced.

In a preferred embodiment of the positive electrode active material for a secondary cell disclosed herein, at least a part of the surface of the base portion is provided with a coating portion in which the electron conductor and the dielectric coexist in close proximity to each other.

By forming a coating portion in which the electron conductor and the dielectric coexist in close proximity to each other (that is, the electron conductor and the dielectric are present in a state in which the two can be recognized to be in contact with each other with an electron microscope or other detection means) on the surface of the base portion, it is possible to form a better conduction path of charge carriers at the hetero-interface between the dielectric and the electron conductor. As a result, further reduction of the internal resistance of the cell can be realized.

Further, in another preferable embodiment of the positive electrode active material for a secondary cell disclosed herein, the electron conductor is a metal oxide having a volume resistivity of $1 \times 10^{-3}$ Ω·m or less at 20° C.

By using the electron conductor which consists of a metal oxide having such an electrical property, the internal resistance of the cell can be reduced more effectively.

Further, in another preferable embodiment of the positive electrode active material for a secondary cell disclosed herein, the dielectric is a metal oxide having a volume resistivity of $1 \times 10^{10}$ Ω·m or more at 20° C.

By using a dielectric which consists of a metal oxide having such an electrical property, the internal resistance of the cell can be reduced more effectively.

Further, in a particularly preferable embodiment of the positive electrode active material for a secondary cell disclosed herein, the base portion is configured of a compound capable of occluding and releasing lithium ions and is used for a positive electrode of a lithium ion secondary cell.

The positive electrode active material disclosed herein makes it possible to realize further reduction of the internal resistance of the cell and is, therefore, suitable for lithium ion secondary cell applications for driving a vehicle where high-rate charging/discharging and high output are required.

Further, by providing the positive electrode active material disclosed herein, it is also possible to provide a secondary cell including the positive electrode active material in a positive electrode. In the secondary cell disclosed herein, the reduction of the internal resistance of the cell can be realized due to the effect of the positive electrode active material as described above.

BRIEF DESCRIPTION OF THE DRAWINGS

FIG. 1 is a cross-sectional view schematically showing the internal structure of a lithium ion secondary cell according to an embodiment.

DETAILED DESCRIPTION OF THE PREFERRED EMBODIMENTS

Hereinafter, a preferred embodiment of the positive electrode active material disclosed herein will be described by using, as an example, a positive electrode active material to be used for a lithium ion secondary cell. Matters other than those specifically mentioned in the present specification and necessary for implementation can be understood as design matters for a person skilled in the art which are based on the related art in the pertinent field. That is, a secondary cell such as a lithium ion secondary cell provided by the present invention may have any one of the positive electrode active materials disclosed herein in the positive electrode, and the structure and the composition of the cell and the positive and negative electrodes themselves are not limited to the embodiment of the lithium ion secondary cell described hereinbelow. The present invention can be suitably practiced in other secondary cells, such as an electric double layer capacitor, a lithium ion capacitor, a sodium ion secondary cell, and the like.

In the present description, the "lithium ion secondary cell" refers to a secondary cell in which a lithium ion is used as an electrolyte ion included in an electrolyte (typically, a liquid, gel or solid nonaqueous electrolyte) to realize the electric conduction by the lithium ions present between positive and negative electrodes. Therefore, in other secondary cells such as a "sodium ion secondary cell", other electrolyte ions (sodium ion or the like) are used as charge carriers in place of the lithium ions.

Further, in the present description, when any numerical range is expressed as A to B (A and B are arbitrary numerical values), it means A or more and B or less.

The positive electrode active material disclosed herein comprises a base portion (that is, the main portion of the positive electrode active material) capable of occluding and releasing lithium ions as charge carriers and preferably including a lithium transition metal complex oxide, and an electron conductor and a dielectric disposed on at least a part of the surface of the base portion. Here, "disposed" means that an electron conductor or a dielectric is attached to a part of the surface of the active material particle constituting the base portion of the positive electrode active material, and the form of bonding between the attached electron conductor or dielectric and the active material base portion (main portion) is not limited.

In a preferred embodiment, a coating portion in which the electron conductor and the dielectric coexist in close proximity to each other is formed on at least a part of the surface of the base portion. Here, "to be mixed in close proximity" means that the electron conductor and the dielectric are present in a state in which the two can be recognized to be in contact under an electron microscope or other detection means.

Positive Electrode Active Material (Base Portion)

As the base portion of the positive electrode active material, those conventionally used as the positive electrode active material of a lithium ion secondary cell can be used without particular limitation. Lithium transition metal complex oxides of various crystal structures such as a layered rock salt structure, a rock salt structure, a spinel structure, and a perovskite structure can be used as the positive electrode active material (base portion). The crystal structure of the lithium transition metal complex oxide can be determined, for example, by a conventional well-known X-ray diffraction measurement or the like.

Preferred examples include lithium transition metal composite oxides having a layered rock salt structure or spinel structure. Such examples include ternary lithium-containing composite oxides such as a lithium nickel composite oxide (for example, $LiNiO_2$), a lithium cobalt composite oxide (for example, $LiCoO_2$), a lithium manganese composite oxide (for example, $LiMn_2O_4$), and a lithium nickel cobalt manganese composite oxide (for example, $LiNi_{1/3}Co_{1/3}Mn_{1/3}O_2$). As in the cells of the related art, the oxide may be a lithium transition metal composite oxide including a transition metal element other than Ni, Co, Mn, a typical metal element and the like. Such an oxide can be exemplified by a lithium transition metal complex oxide represented by the formula: $Li_{1+x}Ni_yCo_zMn_{(1-y-z)}M_\alpha O_{2-\beta}A_\beta$. Here, in the formula, $0 \leq x \leq 0.7$, $0.1 < y < 0.9$, $0.1 < z < 0.4$, $0 \leq \alpha \leq 0.1$, $0 \leq \beta \leq 0.5$, and M may be one or two or more elements selected from Zr, Mo, W, Mg, Ca, Na, Fe, Cr, Zn, Si, Sn, and Al. Also, A may be one or two or more elements selected from F, Cl and Br.

Alternatively, a polyanionic compound such as represented by a general formula $LiMPO_4$, $LiMVO_4$ or $Li_2MSiO_4$ (wherein M is at least one or more elements among Co, Ni, Mn, and Fe) can be used as the positive electrode active material (base portion).

The average particle diameter of the positive electrode active material particles (secondary particles) constituting the base portion is preferably approximately 1 μm to 25 μm. With the positive electrode active material particles (base portion) having such an average particle diameter, good cell performance can be exhibited more stably. Although not particularly limited, the specific surface area may be, for example, 0.1 m²/g or more (typically 0.5 m²/g or more) and 20 m²/g or less (typically 10 m²/g or less). With the positive electrode active material particles having such a structure, high cell characteristics (for example, high output characteristics) can be exhibited even when the electron conductor and the dielectric described above are formed on the surface thereof.

Here, the "average particle diameter" refers to a particle diameter corresponding to a cumulative frequency of 50% by volume from the side of fine particles having a small particle diameter in a volume-based particle size distribution based on a general laser diffraction/light scattering method (also referred to as D50, the median diameter). Further, the "specific surface area" refers to the surface area (BET specific surface area) measured by the BET method (for example, BET one-point method) using nitrogen gas.

Electron Conductor

The electron conductor disposed on the surface of the positive electrode active material (base portion) can be exemplified by various inorganic compounds having a volume resistivity of $1 \times 10^0$ Ω·m or less, in particular $1 \times 10^{-1}$ Ω·m or less at normal temperature (25° C.). More suitable is a compound (for example, a metal oxide) having the volume resistivity of $1 \times 10^{-3}$ Ω·m or less.

Although not particularly limiting, a metal oxide which has a crystal structure represented by any of the formulas $ABO_3$, $AB_2O_4$, or $MO_2$ can be mentioned as a suitable electron conductor. In the formula, A is at least one divalent typical element or lanthanoid element, or a combination thereof, B is at least one selected from transition elements belonging to any of Groups 4 to 11 in the new IUPAC notation, and M is at least one selected from transition elements belonging to any of Groups 5 to 11.

Alternatively, any conductive oxide having free electrons which is composed of a mixture of the above $ABO_3$, $AB_2O_4$ or $MO_2$ may be used.

It is particularly preferable to use a metal oxide having a volume resistivity of $1 \times 10^{-3}$ Ω·m or less (in particular, $1 \times 10^4$ Ω·m or less) at normal temperature (25° C.). Specific preferred examples of the electron conductor (metal oxide) are given in the respective examples described hereinbelow.

Dielectric

The dielectric to be disposed on the surface of the positive electrode active material (base portion) can be exemplified by various inorganic compounds having a volume resistivity of $1 \times 10^5$ Ω·m or more, in particular $1 \times 10^6$ Ω·m or more at normal temperature (25° C.). More preferably, examples include compounds (for example, metal oxides) having the volume resistivity of $1 \times 10^{10}$ Ω·m or more.

Although not specifically limiting, a metal oxide which has a crystal structure represented by any of the formulas $XYO_3$, $X_2Y_2O_7$, or $(XX'_3)Y_4O_{12}$ is mentioned as a suitable dielectric material. In the formulas, X and X' each represent an alkali metal element, an alkaline earth metal element, a rare earth metal element, at least one or two or more divalent typical elements among Cu, Pb and Bi, or a lanthanoid element, or a combination thereof, and Y is at least one selected from transition metal elements and Sn.

The use of metal oxides having a volume resistivity of $1 \times 10^{12}$ Ω·m or more at normal temperature (25° C.) is particularly preferred. Specific preferred examples of the dielectric (metal oxide) are given in the respective examples described hereinbelow.

The electron conductor and the dielectric can be disposed on the surface of the base portion of the positive electrode active material by various chemical and physical methods. For example, the electron conductor and the dielectric can be disposed (formed) on the surface of the base portion of the positive electrode active material also by various vapor deposition methods and sputtering methods. Alternatively, it is possible to attach a raw material (precursor substance) for forming a dielectric or an electron conductor to the surface (base portion) of the positive electrode active material particles, and then heat (bake) under oxidizing conditions to form the target dielectric or electron conductor from the raw material (precursor substance) on the surface (base portion) of the positive electrode active material particles.

A particularly preferable and simple method can be exemplified by mechanochemical treatment performed using various mechanochemical devices. For example, by using a pulverizing and mixing apparatus such as a ball mill, a planetary mill, a bead mill or the like, a desired mechanochemical reaction can be induced to produce positive electrode active material particles of the configuration disclosed herein. For example, electron conductor particles and/or dielectric particles can be attached to the surface of the particles of the positive electrode active material (base portion) by feeding predetermined positive electrode active material particles (powder material), which are to be the base portion, and electron conductor particles (powder material) and/or dielectric particles (powder material) into a predetermined mechanochemical device (dry bead mill and the like) and imparting kinetic energy at a predetermined rotational speed for a predetermined period of time.

In addition, a coating portion in which the electron conductor and the dielectric coexist in close proximity to each other can be formed on at least a part of the surface of the base portion by appropriately adjusting the amount of the positive electrode active material, the amount of the electron conductor and the amount of the dielectric when performing the mechanochemical treatment. Alternatively, an electron conductor and a dielectric coexist and subjected to mechanochemical treatment in advance to prepare a composite composed of the electron conductor and the dielectric, and the composite and the positive electrode active material (base portion) and then mixed and subjected to mechanochemical treatment, thereby making it possible to form a coating portion in which the electron conductor and the dielectric coexist in close proximity to each other, in other words, the composite, on the surface of the base portion.

The ratio of the amount of the positive electrode active material to the amount of the electron conductor and the amount of the dielectric for forming such a coating portion may differ depending on the composition, particle diameter and the like of the positive electrode active material, electron conductor and dielectric used, and is therefore not particularly limited.

The presence of the electron conductor and the dielectric disposed on the surface of the base portion of the positive electrode active material particle obtained by the above-described mechanochemical treatment and the like, and also the elemental composition of the electron conductor and the dielectric can be detected (observed) by various detection means.

For example, the coating portion can be detected by enclosing a positive electrode active material particle or a positive electrode active material layer including the positive electrode active material particle with a resin, preparing a sample for STEM observation of particle cross section by FIB (focused ion beam) processing, and performing STEM observation. Alternatively, spot quantitative analysis can be performed by using a STEM-EDX (scanning electron microscope-energy dispersive X-ray analyzer). Another option is to use a method such as SIMS (secondary ion mass spectrometry), XPS (X-ray photoelectron spectroscopy), XRD (X-ray diffraction), XRF (fluorescent X-ray analysis) and the like.

The content ratio of each of the electron conductor and the dielectric disposed on the surface of the positive electrode active material constituting the base portion is not particularly limited, and the electron conductor and the dielectric may be disposed on the base portion in an amount suitable for the purpose of the present invention. For example, the dielectric is preferably contained at a content ratio of about 0.01% by mass to 15% by mass with respect to the total mass (that is, 100% by mass) of the base portion of the positive electrode active material. Further, the electron conductor is preferably contained at a content ratio of about 0.005% by mass to 10% by mass with respect to the total mass of the base portion of the positive electrode active material. With the lithium ion secondary cell constructed by using the positive electrode active material in which the electron conductor and the dielectric are disposed on the surface of the base portion at such content ratios, the reduction of the internal resistance of the cell and the increase in capacity retention rate (durability) can be suitably realized.

The positive electrode active material disclosed herein makes it possible to realize satisfactory output characteristics (reduction of the internal resistance of the cell), and thus can be suitably used as a positive electrode active material of a lithium ion secondary cell and any other secondary cell. The method of constructing a lithium ion secondary cell or any other secondary cell, various materials to be used, the form of the cell, and the like, are not limited, except that the positive electrode active material disclosed herein is provided on the positive electrode, and may be the same as the conventional ones.

For example, secondary cells of various forms such as a nonaqueous electrolyte secondary cell (for example, a non-aqueous electrolyte lithium ion secondary cell) including a nonaqueous electrolytic solution as an electrolyte, an all-solid cell (for example, an all-solid lithium ion secondary cell) including a solid electrolyte as an electrolyte, a secondary cell (for example, a lithium ion polymer secondary cells) including a gel-like polymer as an electrolyte can be provided.

As a typical secondary cell form, there is a so-called secondary cell having a sealed structure in which an electrode body provided with a positive electrode, a negative electrode and a separator is housed together with a suitable electrolyte in a metal or laminate film outer case. Typical examples of the electrode body to be accommodated include a so-called laminated electrode body in which a plurality of sheet-shaped positive electrodes, negative electrodes and separators is laminated, and a so-called wound type electrode body in which long sheet-shaped positive electrodes, negative electrodes and separators (usually two sheets) are laminated and the laminate is wound in the length direction.

For example, a lithium ion secondary cell 100 shown in FIG. 1 is a sealed cell constructed by accommodating a flat wound electrode body 20 and a nonaqueous electrolytic solution (not shown) in a flat rectangular cell case (that is, an outer container) 30. The cell case 30 is provided with a positive electrode terminal 42 and a negative electrode terminal 44 for external connection, and a thin-walled safety valve 36 that is set to release the internal pressure when the internal pressure of the cell case 30 rises to or above a predetermined level. The cell case 30 is also provided with an injection port (not shown) for injecting the nonaqueous electrolytic solution. The positive electrode terminal 42 is electrically connected to the positive electrode current collector 42*a*. The negative electrode terminal 44 is electrically connected to the negative electrode current collector 44*a*. As a material of the cell case 30, for example, a lightweight and thermally conductive metal material such as aluminum is used.

The wound electrode body 20 has a form obtained by laminating a sheet-shaped positive electrode 50 in which a positive electrode active material layer 54 is formed along the longitudinal direction on one side or both sides (here, both sides) of a long positive electrode collector 52 and a sheet-shaped negative electrode 60 in which a negative electrode active material layer 64 is formed along the longitudinal direction on one side or both sides (here, both sides) of a negative electrode current collector 62, with two long separators 70 being interposed therebetween, and winding the laminate in the longitudinal direction. Further, the positive electrode current collector 42*a* and the negative electrode current collector 44*a* are respectively joined to a positive electrode active material layer non-formation portion 52*a* (that is, a portion where the positive electrode active material layer 54 is not formed and the positive electrode current collector 52 is exposed) and a negative electrode active material layer non-formation portion 62*a* (that is, a portion where the negative electrode active material layer 64 is not formed and the negative electrode current collector 62 is exposed) that are formed to protrude outward from both ends of the wound electrode body 20 in the winding axis direction (refer to the sheet width direction orthogonal to the longitudinal direction).

The positive electrode 50 constituting the electrode body 20 has the positive electrode active material layer 54 formed by attaching, to a predetermined thickness, a composition (for example, a paste-like (slurry-like) feed material prepared by adding a nonaqueous solvent, or a granulated product obtained by granulating a positive electrode active material with an additive) prepared by mixing the positive electrode active material with an additive such as a conductive material, a binder and the like to one surface or both surfaces of the positive electrode current collector 52 made of a sheet-shaped aluminum foil or the like. Meanwhile, the negative electrode 60 constituting the electrode body 20 has the negative electrode active material layer 64 formed by attaching, to a predetermined thickness, a composition (for example, a paste-like (slurry-like) feed material prepared by adding a nonaqueous solvent, or a granulated product obtained by granulating a negative electrode active material with an additive) prepared by mixing the negative electrode active material with an additive such as a binder, a thickening agent and the like to one surface or both surfaces of the negative electrode current collector 62 made of a sheet-shaped copper foil or the like. The separator 70 is typically configured of a sheet material having a plurality of minute holes. For example, a separator having a single layer structure or a separator having a laminated structure made of a porous polyolefin resin such as polypropylene (PP) or polyethylene (PE) can be used as the separator 70. In addition, an inorganic filler layer (for example, a heat-resistant layer composed of a filler such as a metal oxide, a metal hydroxide and the like) having an insulating property may be further provided.

The description of the structure, construction material, and the like of the secondary cell described above is of general nature, and does not particularly characterize the present invention. Therefore, further detailed description and illustration are omitted. It would be easy for a person skilled in the art to construct lithium ion secondary cells and other secondary cells by adopting the conventional materials and manufacturing processes in addition to using the positive electrode active material disclosed herein.

Hereinafter, some test examples relating to the present invention will be described, but the present invention is not intended to be limited to the configurations shown in the test examples.

Test Example 1

In the present test example, various types of electron conductors and dielectrics were adopted to prepare positive electrode active materials, and the internal resistance of the cells and the capacity retention rate (cycle characteristics) indicating the degree of durability were evaluated with respect to lithium ion secondary cells constructed using these positive electrode active materials.

Example 1

Preparation of Positive Electrode Active Material

Predetermined amounts of metal sulfates other than Li sulfate were dissolved, and a precursor was obtained while neutralizing with NaOH. Next, the obtained precursor was mixed with a predetermined amount of lithium carbonate, baked at 800° C. for 15 h, and then pulverized to obtain a positive electrode active material comprising $LiNi_{1/3}Co_{1/3}Mn_{1/3}O_2$ having an average particle size of 10 μm (base portion).

Next, a predetermined amount of $SrMoO_3$ as an electron conductor was mixed with the prepared positive electrode active material, and stirring was performed at 5000 rpm for 5 min using a commercially available mechanochemical device (mill device). Thus, a positive electrode active material in which the electron conductor ($SrMoO_3$) was disposed on the surface of the positive electrode active material (base portion) was prepared.

Next, a predetermined amount of $SrTiO_3$ as a dielectric was mixed with the electron conductor-containing positive electrode active material thus prepared, and stirring was carried out at 5000 rpm for 5 min using a commercially available mechanochemical device (mill device). Thus, a dielectric ($SrTiO_3$) was further disposed on the surface of the electron conductor-containing positive electrode active material (base portion), and a positive electrode active material according to Example 1 including both the electron conductor and the dielectric was prepared. The positive electrode active material according to Example 1 included 0.008% by mass of the electron conductor ($SrMoO_3$) and 1.5% by mass of the dielectric ($SrTiO_3$) with respect to 100% by mass of the base portion of the positive electrode active material.

Preparation of Paste for Forming Positive Electrode Active Material Layer

The produced positive electrode active material according to this example was used and acetylene black (AB) as a conductive material, polyvinylidene fluoride (PVdF) as a binder (binding material), and a dispersing agent were weighed so that mass ratios of these materials were 80:8:2:0.2 in the order of description. Then, these materials were mixed together with N-methylpyrrolidone (NMP) by using a planetary mixer to prepare a paste for forming a positive electrode active material layer (solid content: 56% by weight).

Preparation of Lithium Ion Secondary Cell

The obtained paste material was uniformly coated on both sides of a strip-shaped aluminum foil (positive electrode current collector) using a die coater, dried, and then subjected to compression treatment using a roll press to obtain a positive electrode sheet provided with the positive electrode active material layer of predetermined thickness on both sides of the positive electrode current collector.

Further, a graphite-based material generally used as a negative electrode active material for a lithium ion secondary cell, styrene butadiene rubber (SBR) as a binder, and carboxymethyl cellulose (CMC) as a thickener were weighed to obtain mass ratios of 80:10:10 in the order of description. These materials were mixed in water to prepare a paste for forming a negative electrode active material layer. This material was uniformly coated on both sides of a copper foil (negative electrode current collector), dried, and then subjected to compression treatment using a roll press to prepare a negative electrode sheet.

The prepared positive electrode sheet and negative electrode sheet were wound together with the separator sheet to produce a flat wound electrode body. A porous resin sheet in which a polypropylene layer was laminated on both sides of a polyethylene layer was used as a separator sheet. After welding the current collecting members to the non-formation portions of the active material layers at both end portions of the flat wound electrode body in the width direction (direction orthogonal to the winding direction), the flat wound electrode body was housed in a rectangular parallelepiped cell case.

Next, ethylene carbonate (EC), dimethyl carbonate (DMC) and ethyl methyl carbonate (EMC) were mixed so that the volume ratio was 3:3:3, and $LiPF_6$ as a supporting salt was dissolved in the mixed solvent at a concentration of 1.0 mol/L to prepare a nonaqueous electrolyte. Then, the nonaqueous electrolyte was poured into the cell case body, and the cell case was sealed with a lid to construct a lithium ion secondary cell including the positive electrode active material according to Example 1 in the positive electrode.

Activation Treatment and Evaluation of Characteristics

The constructed lithium ion secondary cell was constant-current (CC) charged at a rate of ⅓C to a voltage of 4.2 V under a temperature environment of 25° C., and then constant-voltage (CV) charged at a current value of ⅟50C to obtain a full-charge state (SOC 100%). Thereafter, the cell was constant-current (CC) discharged at a rate of ⅓C to a voltage of 3 V under a temperature environment of 25° C., and the CC discharge capacity at this time was taken as the initial discharge capacity. Here, 1C means a current value capable of charging the cell capacity (Ah), which is estimated from the theoretical capacity of the active material, in 1 h.

Next, the lithium ion secondary cell adjusted to an open circuit voltage of 3.70 V was CC discharged at a rate of 20C until the inter-terminal voltage became 3.3 V under a temperature environment of −5° C., and the discharge capacity was measured. Then, the internal resistance of the cell at −5° C. was calculated from the inter-terminal voltage value at 5-th second after the start of discharge and the discharge current value. The results are shown in the corresponding columns of Table 1. The internal resistance values of the cells of each Example and Comparative Example in the table indicate relative values obtained when the internal resistance of the lithium ion secondary cell of Comparative Example 1 described hereinbelow is used as a reference (1).

Furthermore, for the constructed lithium ion secondary cell, 500 cycles of charging and discharging were repeated at a charge and discharge rate of 2C in a voltage range of 4.2 V to 3.0 V under a temperature condition of 60° C. The value obtained by dividing the discharge capacity of the 500th cycle by the initial discharge capacity was taken as a capacity retention rate (%). The results are shown in the corresponding columns of Table 1.

Examples 2 to 24

The positive electrode active material according to each Example was produced using the same materials and processes as in Example 1 except that the electron conductor and the dielectric were used in the combinations shown in Table 1, and the lithium ion secondary cells were constructed in the same manner as in Example 1, and similar characteristic evaluation was performed. The results are shown in the corresponding columns of Table 1.

Comparative Example 1

The same lithium-ion secondary cell as in Example 1 was constructed using a positive electrode active material composed of only the base portion (that is, the positive electrode active material including neither an electron conductor nor a dielectric) obtained with the same materials and process as in Example 1, and similar characteristic evaluation was performed. The results are shown in the corresponding columns of Table 1.

Comparative Example 2

The same lithium-ion secondary cell as in Example 1 was constructed using a positive electrode active material in which only an electron conductor was disposed on the base portion surface (that is, the positive electrode active material including no dielectric) obtained with the same materials and process as in Example 1, and similar characteristic evaluation was performed. The results are shown in the corresponding columns of Table 1.

Comparative Example 3

The same lithium-ion secondary cell as in Example 1 was constructed using a positive electrode active material in which only a dielectric was disposed on the base portion surface (that is, the positive electrode active material including no electron conductor) obtained with the same materials and process as in Example 1, and similar characteristic evaluation was performed. The results are shown in the corresponding columns of Table 1.

TABLE 1

| Sample | Electron conductor | Dielectric | Internal resistance (relative value) | Capacity retention rate (%) |
|---|---|---|---|---|
| Comparative Example 1 | — | — | 1 | 40 |
| Comparative Example 2 | $SrMoO_3$ | — | 0.95 | 45 |
| Comparative Example 3 | — | $SrTiO_3$ | 0.9 | 51 |
| Example 1 | $SrMoO_3$ | $SrTiO_3$ | 0.61 | 76 |
| Example 2 | $SrMoO_3$ | $BaTiO_3$ | 0.62 | 74 |
| Example 3 | $SrMoO_3$ | $BiFeO_3$ | 0.63 | 75 |
| Example 4 | $SrMoO_3$ | $CaCuTi_4O_{12}$ | 0.62 | 73 |
| Example 5 | $SrMoO_3$ | $NaNbO_3$ | 0.65 | 74 |
| Example 6 | $SrMoO_3$ | $Sr_2Ta_2O_7$ | 0.61 | 76 |
| Example 7 | $SrMoO_3$ | $KNbO_3$ | 0.68 | 73 |
| Example 8 | $SrMoO_3$ | $PbZrO_3$ | 0.66 | 77 |
| Example 9 | $SrMoO_3$ | $Ba_{0.7}La_{0.3}TiO_3$ | 0.6 | 72 |
| Example 10 | $SrMoO_3$ | $BaMn_{0.3}Ti_{0.7}O_3$ | 0.66 | 70 |
| Example 11 | $SrMoO_3$ | $BaCo_{0.3}Ti_{0.7}O_3$ | 0.68 | 68 |
| Example 12 | $SrMoO_3$ | $BaHfO_3$ | 0.6 | 71 |
| Example 13 | $LaTiO_3$ | $SrTiO_3$ | 0.64 | 72 |
| Example 14 | $SrVO_3$ | $SrTiO_3$ | 0.63 | 70 |
| Example 15 | $SrCrO_3$ | $SrTiO_3$ | 0.67 | 71 |
| Example 16 | $LaMn_{0.5}Co_{0.5}O_3$ | $SrTiO_3$ | 0.61 | 74 |
| Example 17 | $SrFeO_3$ | $SrTiO_3$ | 0.67 | 74 |
| Example 18 | $La_{0.8}Sr_{0.2}Co_{0.3}Ni_{0.7}O_3$ | $SrTiO_3$ | 0.61 | 75 |
| Example 19 | $LaCuO_3$ | $SrTiO_3$ | 0.61 | 76 |
| Example 20 | $LiTi_2O_4$ | $SrTiO_3$ | 0.64 | 69 |
| Example 21 | $LiV_2O_4$ | $SrTiO_3$ | 0.66 | 68 |
| Example 22 | $MnO_2$ | $SrTiO_3$ | 0.63 | 73 |
| Example 23 | $RuO_2$ | $SrTiO_3$ | 0.62 | 72 |
| Example 24 | $IrO_2$ | $SrTiO_3$ | 0.65 | 77 | characteristic evaluation was performed. The results are shown in the corresponding columns of Table 1.

As is apparent from the results of the Examples shown in Table 1, in the lithium ion secondary cells in which the positive electrodes are provided with the positive electrode active materials according to the Examples characterized by including both the electron conductor and the dielectric, a reduction in the internal resistance of the cell and a high capacity retention rate were realized regardless of the type of compounds constituting the electron conductor or dielectric.

Test Example 2

In this test example, positive electrode active materials were prepared by varying, as appropriate, the amount of the electron conductor and the dielectric disposed in the base portion of the positive electrode active material, and lithium ion secondary cells constructed using the positive electrode active materials were evaluated in the same manner as in Test Example 1.

Examples 25 to 39

The positive electrode active material according to each example was produced using the same materials and processes as in Example 1 except that the supplied amount of the electron conductor ($SrMoO_3$) or the supplied amount of the dielectric ($SrTiO_3$) fed to the mechanochemical device (mill) was varied as appropriate, and the lithium ion secondary cells were constructed in the same manner as Example 1 and similar characteristic evaluation was performed. The results are shown in the corresponding columns of Table 2.

preferable that the dielectric be included at a content ratio of 0.01% by mass to 15% by mass (for example, 0.01% by mass to 11% by mass) with respect to the total mass (that is, 100% by mass) of the base portion of the positive electrode active material. Further, it is particularly preferable that the electron conductor be included at a content ratio of 0.005% by mass to 10% by mass (for example, 0.005% by mass to 8% by mass) with respect to the total mass of the base portion of the positive electrode active material.

Test Example 3

In this test example, positive electrode active materials having different compositions and different crystal structures were prepared, and lithium ion secondary cells constructed using the positive electrode active materials were evaluated in the same manner as in Test Example 1.

Comparative Examples 4 to 9 and Examples 40 to 45

The positive electrode active material according to each Example was produced using the same materials and processes as in Example 1 and Comparative Example 1 except that various positive electrode active materials having structural formulas shown in Table 3 were used, and the lithium ion secondary cells were constructed in the same manner as Example 1 and similar characteristic evaluation was performed. The results are shown in the corresponding columns

TABLE 2

| Sample | Electron conductor | Dielectric | Amount of electron conductor (% by weight) | Amount of dielectric (% by weight) | Internal resistance (relative value) | Capacity retention rate (%) |
|---|---|---|---|---|---|---|
| Comparative Example 1 | — | — | — | — | 1 | 40 |
| Example 25 | $SrMoO_3$ | $SrTiO_3$ | 1 | 0.008 | 0.68 | 67 |
| Example 26 | $SrMoO_3$ | $SrTiO_3$ | 1 | 0.01 | 0.41 | 90 |
| Example 27 | $SrMoO_3$ | $SrTiO_3$ | 1 | 0.5 | 0.43 | 93 |
| Example 28 | $SrMoO_3$ | $SrTiO_3$ | 1 | 1 | 0.38 | 95 |
| Example 29 | $SrMoO_3$ | $SrTiO_3$ | 1 | 5 | 0.4 | 94 |
| Example 30 | $SrMoO_3$ | $SrTiO_3$ | 1 | 10 | 0.41 | 93 |
| Example 31 | $SrMoO_3$ | $SrTiO_3$ | 1 | 11 | 0.44 | 94 |
| Example 32 | $SrMoO_3$ | $SrTiO_3$ | 0.003 | 11 | 0.65 | 69 |
| Example 33 | $SrMoO_3$ | $SrTiO_3$ | 0.005 | 11 | 0.41 | 91 |
| Example 34 | $SrMoO_3$ | $SrTiO_3$ | 0.01 | 11 | 0.43 | 93 |
| Example 35 | $SrMoO_3$ | $SrTiO_3$ | 0.5 | 11 | 0.45 | 92 |
| Example 36 | $SrMoO_3$ | $SrTiO_3$ | 0.9 | 11 | 0.39 | 94 |
| Example 37 | $SrMoO_3$ | $SrTiO_3$ | 5 | 11 | 0.46 | 90 |
| Example 38 | $SrMoO_3$ | $SrTiO_3$ | 8 | 11 | 0.47 | 91 |
| Example 39 | $SrMoO_3$ | $SrTiO_3$ | 8.4 | 11 | 0.7 | 68 |

As apparent from the results of the Examples shown in Table 2, it was confirmed that by including both the electron conductor and the dielectric, it is possible to realize a reduction of the internal resistance of the cell and a high capacity retention rate. Further, regarding the content ratio of the electron conductor and dielectric, it is particularly of Table 3. The internal resistance values of the cells of each Example in the table indicate relative values obtained when the internal resistance of the lithium ion secondary cell of the Comparative Example corresponding to each respective positive electrode active material used described hereinbelow is used as a reference (1).

TABLE 3

| Sample | Positive electrode active material | Electron conductor | Dielectric | Internal resistance (relative value) | Capacity retention rate (%) |
|---|---|---|---|---|---|
| Comparative Example 4 | $LiCoO_2$ | — | — | 1 | 43 |
| Example 40 | $LiCoO_2$ | $SrMoO_3$ | $SrTiO_3$ | 0.65 | 74 |

TABLE 3-continued

| Sample | Positive electrode active material | Electron conductor | Dielectric | Internal resistance (relative value) | Capacity retention rate (%) |
|---|---|---|---|---|---|
| Comparative Example 5 | $LiMn_2O_4$ | — | — | 1 | 43 |
| Example 41 | $LiMn_2O_4$ | $SrMoO_3$ | $SrTiO_3$ | 0.66 | 79 |
| Comparative Example 6 | $LiNiO_2$ | — | — | 1 | 40 |
| Example 42 | $LiNiO_2$ | $SrMoO_3$ | $SrTiO_3$ | 0.68 | 77 |
| Comparative Example 7 | $LiNi_{0.5}Mn_{1.5}O_4$ | — | — | 1 | 46 |
| Example 43 | $LiNi_{0.5}Mn_{1.5}O_4$ | $SrMoO_3$ | $SrTiO_3$ | 0.63 | 72 |
| Comparative Example 8 | $LiNi_{0.8}Co_{0.15}Al_{0.05}O_2$ | — | — | 1 | 44 |
| Example 44 | $LiNi_{0.8}Co_{0.15}Al_{0.05}O_2$ | $SrMoO_3$ | $SrTiO_3$ | 0.64 | 72 |
| Comparative Example 9 | $LiFePO_4$ | — | — | 1 | 41 |
| Example 45 | $LiFePO_4$ | $SrMoO_3$ | $SrTiO_3$ | 0.68 | 76 |

As is apparent from the results of the Examples shown in Table 3, in the lithium ion secondary cells in which the positive electrodes are provided with the positive electrode active materials according to the Examples characterized by including both the electron conductor and the dielectric, a reduction in the internal resistance of the cell and a high capacity retention rate were realized regardless of the type of compounds constituting the electron conductor or dielectric.

Test Example 4

In this test example, positive electrode active materials provided with a coating portion (a composite of an electron conductor and a dielectric) in which the electron conductor and the dielectric were mixed in close proximity to each other were prepared, and lithium ion secondary cells constructed using the positive electrode active materials were evaluated in the same manner as in Test Example 1.

Example 46

An electron conductor ($SrMoO_3$) and a dielectric ($SrTiO_3$) were mixed in advance and subjected to mechanochemical treatment (5000 rpm, 5 min) to prepare a powder of a composite of the electron conductor and the dielectric. Then, the prepared composite and the positive electrode active material ($LiNi_{1/3}Co_{1/3}Mn_{1/3}O_2$) prepared in the same manner as in Example 1 were mixed, and mechanochemical treatment (5000 rpm, 5 min) was performed. In this way, a positive electrode active material according to Example 46 was prepared in which a coating portion made of the composite of the electron conductor and the dielectric was formed on the surface of the positive electrode active material (base portion). Subsequently, a lithium ion secondary cell was constructed in the same manner as in Example 1 and similar characteristic evaluation was performed. The results are shown in the corresponding columns of Table 4.

TABLE 4

| Sample | Electron conductor | Dielectric | Internal resistance (relative value) | Capacity retention rate (%) |
|---|---|---|---|---|
| Comparative Example 1 | — | — | 1 | 40 |
| Example 1 | $SrMoO_3$ | $SrTiO_3$ | 0.61 | 76 |
| Example 46 | $SrMoO_3$ (composite) | $SrTiO_3$ (composite) | 0.51 | 83 |

As is apparent from the results of Example 46 shown in Table 4, it was recognized that where a coating portion in which the electron conductor and the dielectric coexist in close proximity to each other (here, present as a composite) is present on at least a part of the surface of the base portion, more preferable reduction in the internal resistance of the cell and a high capacity retention rate can be realized.

The present invention has been described in detail above, but the above embodiment and test examples are merely exemplary, and the invention disclosed herein is inclusive of various modifications and changes of the specific example described hereinabove. Since a secondary cell such as a lithium ion secondary cell including the positive electrode active material disclosed herein exhibits excellent output characteristics and durability as described above, the cell can be suitably used as, for example, a power supply for driving a motor (electric motor) mounted on a vehicle such as an automobile.

What is claimed is:

1. A particulate positive electrode active material to be used for a secondary cell, the particulate positive electrode active material comprising:
    a particulate base portion including a compound capable of occluding and releasing charge carriers;
    a particulate electron conductor disposed on at least a part of a surface of the particulate base portion, the particulate electron conductor being selected from the group consisting of $SrMoO_3$, $SrVO_3$, $SrCrO_3$, $SrFeO_3$, $LaMn_{0.5}Co_{0.5}O_3$, and $La_{0.8}Sr_{0.2}Co_{0.3}Ni_{0.7}O_3$; and
    a particulate dielectric disposed on at least a part of the surface of the particulate base portion.

2. The particulate positive electrode active material according to claim 1, wherein the particulate electron conductor and the particulate dielectric coexist as a composite particulate of the electron conductor and the particulate dielectric on the surface of the particulate base portion.

3. The particulate positive electrode active material according to claim 1, wherein the particulate dielectric is selected from the group consisting of $SrTiO_3$, $BaTiO_3$, $BiFeO_3$, $CaCuTi_4O_{12}$, $NaNbO_3$, $Sr_2TaO_7$, $KNbO_3$, $PbZrO_3$, $Ba_{0.7}La_{0.3}TiO_3$, $BaMn_{0.3}Ti_{0.7}O_3$, $BaCo_{0.3}Ti_{0.7}O_3$, and $BaHfO_3$.

4. The particulate positive electrode active material according to claim 2, wherein the particulate dielectric is selected from the group consisting of $SrTiO_3$, $BaTiO_3$, $BiFeO_3$, $CaCuTi_4O_{12}$, $NaNbO_3$, $Sr_2TaO_7$, $KNbO_3$, $PbZrO_3$, $Ba_{0.7}La_{0.3}TiO_3$, $BaMn_{0.3}Ti_{0.7}O_3$, $BaCo_{0.3}Ti_{0.7}O_3$.

5. The particulate positive electrode active material according to claim 1, wherein the particulate base portion is composed of a compound capable of occluding and releasing lithium ions and is used for a positive electrode of a lithium ion secondary cell.

6. A secondary cell comprising the particulate positive electrode active material according to claim 1 in a positive electrode.

7. The particulate positive electrode active material according to claim 1, wherein an average particle diameter of the particulate base portion is from 1 µm to 25 µm.

8. The particulate positive electrode active material according to claim 1, wherein the particulate dielectric is contained at a content ratio of from 0.01% by mass to 15% by mass with respect to a total mass of the particulate base portion, and the particulate electron conductor is contained at a content ratio of from 0.005% by mass to 10% by mass with respect to the total mass of the particulate base portion.

* * * * *